United States Patent [19]

Brown et al.

[11] Patent Number: 5,123,258
[45] Date of Patent: Jun. 23, 1992

[54] AIR CONDITIONING SYSTEM

[76] Inventors: George S. Brown, 5132 Magnolia Ridge Rd., Fruitland Park, Fla. 34731; James J. Queen, 29411 Jessies La., Leesburg, Fla. 34748

[21] Appl. No.: 734,628

[22] Filed: Jul. 23, 1991

[51] Int. Cl.⁵ ............................................. B60H 1/32
[52] U.S. Cl. ...................................... 62/244; 62/263; 165/53
[58] Field of Search .................. 62/239, 244, 263; 98/2.11; 165/42, 43, 53

[56] References Cited

U.S. PATENT DOCUMENTS

| | | |
|---|---|---|
| 3,871,188 | 3/1975 | Vold et al. .................... 62/263 X |
| 4,736,597 | 4/1988 | Anderson et al. ............. 62/263 X |
| 4,907,419 | 3/1990 | Kruck et al. .................. 62/263 |
| 5,046,327 | 9/1991 | Walker et al. ................. 62/244 |

*Primary Examiner*—William E. Tapolcai
*Attorney, Agent, or Firm*—Dominik, Stein, Saccocio, Reese, Colitz & Van Der Wall

[57] ABSTRACT

A replacement rear door for a van comprising in combination an interior front panel, an exterior rear panel with exterior peripheral panels defining an internal equipment storage zone; an air conditioning system housed entirely within the equipment storage zone for cooling the warm air generated in the passenger section of the van; a gasoline powered internal combustion engine for generating the power to operate the air conditioning system; gasoline connection means adapted to be coupled into the main gasoline supply line for supplying fuel to the engine; electric connection means adapted to couple the main battery of the van to the peripheral equipment of the engine; electronic means for controlling the stopping and starting of the air conditioning system; and hinge means extending outwardly from one of the exterior side panels for mating with the body hinges on the van.

11 Claims, 6 Drawing Sheets

AIR CONDITIONING SYSTEM

BACKGROUND OF THE INVENTION

1. Summary of the Invention

This invention relates to an air conditioning system, and, more particularly, to a rear mounted, forward facing air conditioning unit mounted inside an interchangeable rear door for vans and recreational vehicles.

2. Description of the Background Art

There is an increasing popularity of vans, particularly vans converted into recreational vehicles (RV's) for passenger usage. Such popularity has forced the van conversion industry to adapt known air conditioning systems in order to supplement the original under-the-hood air conditioning systems supplied with the basic van. The adapted air conditioning systems are generally those initially developed to transport refrigeration for commercial trailers. The results have not been satisfactory.

The converted van needs a supplemental cooling system that is small, compact, and installable without cutting the van sheet metal. Such a system must be capable of delivering cool air to the rear portion of the van which now houses passengers. It should also be operable from a remote control panel mounted on the dashboard near the driver, and it should operate independently of the main internal combustion engine that powers the recreational vehicle on the road. Finally, such system should be readily accessible for maintenance, repair and replacement of the cooling system components.

Many systems have been developed to provide air conditioning for commercial vehicles, particularly over-the-road trailers and medium sized trucks used for route delivery of refrigerated products such as fresh meats, flowers, produce and the like. Typically, the systems utilize an auxiliary internal combustion engine, a compressor, a condenser charged with a refrigerant, and an evaporator for heat exchange purposes. The auxiliary internal combustion engine has the necessary electrical equipment for starting, stopping and controlling the auxiliary internal combustion engine. Gasoline is supplied to the auxiliary internal combustion engine via connecting fuel lines tapped into the main fuel line that runs from the gas tank to the main internal combustion engine. The shortcomings of the known apparatus for cooling the rear passenger section of a converted van or a recreational vehicle is evidenced by the large number of patents issued for units attempting to overcome the deficiencies of the prior art.

Typical of the background art is U.S. Pat. No. 3,512,373 issued to J. H. White which discloses a refrigerated system with an electrically powered auxiliary motor. In addition, U.S. Pat. No. 4,551,986 issued to Anderson discloses a transport refrigeration unit with a slim width design mounted on the exterior front wall of a trailer and blowing cooled air backwards in the cargo section of the trailer. U.S. Pat. No. 4,394,818 issued to Brownfield discloses a transport refrigeration unit with a removable power pack for mounting on the outside front wall of a trailer and blowing cooled air backwards into the cargo section of the trailer. U.S. Pat. No. 4,432,213 issued to Katahira discloses using an auxiliary air conditioning system adjacent to a wheel housing in a motor vehicle and further discloses utilizing the roof pillar as a distribution channel for delivering cooled air to the passenger section of the motor vehicle, while U.S. Pat. No. 4,748,825 issued to King discloses a roof mounted air conditioning unit for cooling the interior of a bus. Anderson in U.S. Pat. No. 4,736,597 discloses a transport refrigeration system suitable for narrow post highway trailers with a minimum projection into the cargo space for cooling the air in the trailer cargo space; and Viegas in U.S. Pat. No. 4,770,002 discloses a transport refrigeration system with a two blower configuration for cooling the cargo space of the trailers. The unit is mounted on the outside front wall of the trailer and blows the cooled air backwards into the cargo section of the trailer. U.S. Pat. No. 4,825,663 issued to Nijjar discloses an auxiliary air conditioning system for trucks that interconnects to the primary cooling system of the truck and utilizes the truck primary cooling system for the heat exchange purposes. Note in particular, U.S. Pat. No. 4,217,764 issued to Armbruster. According to that disclosure, a roof mounted air conditioning system is used to cool the passenger section of a van or recreational vehicle. The warm air is inducted into the evaporator section adjacent to the roof and the cooled air is blown backwards toward the rear doors of the van or recreational vehicle, adjacent to the roof. The auxiliary internal combustion engine, compressor, and motor controls are mounted on the roof. The evaporator section is adjacent and below the internal combustion engine in a cut-out section of the roof panel.

As illustrated by the background art, efforts are continuously being made in an attempt to improve air conditioning systems for van and recreational vehicles. No prior effort, however, provides the benefits attendant with the present invention. Additionally, the prior patents and commercial techniques do not suggest the present inventive combination of component elements arranged and configured as disclosed and claimed herein.

The present invention achieves its intended purposes, objects, and advantages through a new, useful and unobvious combination of method steps and component elements, with the use of a minimum number of functioning parts, at a reasonable cost to manufacture, and by employing only readily available materials.

Therefore, it is an object of this invention to provide a replacement rear door for a van comprising in combination an interior front panel, an exterior rear panel with exterior peripheral panels defining an internal equipment storage zone; an air conditioning system housed entirely within the equipment storage zone for cooling the warm air generated in the passenger section of the van; a gasoline powered internal combustion engine for generating the electric power to operate the air conditioning system; gasoline connection means adapted to be coupled into the main gasoline supply line for supplying fuel to the engine; electric connection means adapted to couple the main battery of the van to the peripheral equipment of the engine; electronic means for controlling the stopping and starting of the air conditioning system; and hinge means extending outwardly from one of the panels for mating with the body hinges on the van.

It is a further object of the present invention to convert vans to recreational vehicles efficiently and economically.

It is a further object of the present invention to cool recreational vehicles with air conditioning equipment independent of original equipment.

It is a further object of the present invention to position air conditioning components of a vehicle for convenient maintenance and repair.

The foregoing has outlined some of the more pertinent objects of the invention. These objects should be construed to be merely illustrative of some of the more prominent features and applications of the intended invention. Many other beneficial results can be obtained by applying the disclosed invention in a different manner or modifying the invention within the scope of the disclosure. Accordingly, other objects and a fuller understanding of the invention may be had by referring to the summary of the invention and the detailed description of the preferred embodiments in addition to the scope of the invention defined by the claims taken in conjunction with the accompanying drawings.

SUMMARY OF THE INVENTION

The invention is defined by the appended claims with the specific embodiment shown in the attached drawings. For the purpose of summarizing the invention, the invention may be incorporated into an integrated van cooling system for the direct replacement of an existing rear door in a van comprising in combination a rear door having an interior front panel and an exterior rear panel coupled around their peripheries for defining therebetween an internal equipment storage zone; and an upper chamber within the storage zone having evaporator and blower means positioned for drawing warm air from a passenger section of the van through the upper chamber and for discharging cooled air back into the passenger section of the van; a lower chamber within the storage zone having an engine positioned for generating power and an alternator for converting such power into alternating current; an intermediate chamber within the storage zone having a freon compressor operatively coupled with respect to the engine for compressing and circulating the cooling fluid; condensing means in the storage zone between the intermediate and lower chambers with an associated fan for transferring the heat from the refrigerant in a flow of air from a source of outside air and discharging the warmed outside air to the atmosphere through a plurality of louvers on the exterior rear panel; control means to regulate the starting and stopping of the fan, blower means and the compressor; supply means for delivering gasoline to the engine; and a plurality of hinge means extending outwardly from one of the panels for mating with the body hinges on the van.

One of the panels includes a plurality of louvered openings depending outwardly and downwardly for urging induction of fresh air to support the continued combustion process within the gasoline powered engine and wherein the rear panel further includes a plurality of parallel, louvered openings depending outwardly and downwardly for urging discharge of the exhaust gases produced by the motor. The cooling system further includes an access service door hingably connected to the rear panel for allowing the driver to access, inspect and service the engine. The cooling system further includes an alternator coupled to an electric motor for driving the compressor. The control means further includes a rocker switch, a plurality of other switches, a light emitting diode and a panel light for operating and controlling the gasoline powered motor, and for indicating the time and operational status of the gasoline powered engine to the operator. The control panel is mounted on the dashboard adjacent to the driver in the passenger section of the van for housing the control means. The cooling system further includes a power cord couplable to an external source of current for powering an electric motor for driving the compressor independent of the engine.

The invention may also be incorporated into a replacement rear door for a van comprising in combination an interior front panel, an exterior rear panel with exterior peripheral panels defining an internal equipment storage zone; an air conditioning system housed entirely within the equipment storage zone for cooling the warm air generated in the passenger section of the van; a gasoline powered internal combustion engine for generating the power to operate the air conditioning system; gasoline connection means adapted to be coupled into the main gasoline supply line for supplying fuel to the engine; electric connection means adapted to couple the main battery of the van to the peripheral equipment of the engine; electronic means for controlling the stopping and starting of the air conditioning system; and hinge means extending outwardly from one of the exterior side panels for mating with the body hinges on the van. The replacement rear door is used to replace one existing rear door on the van. The air conditioning system comprises a lower chamber supporting the engine, an upper chamber supporting an evaporator and blower, intermediate chamber supporting a compressor, and a condenser rigidly attached in a generally vertical orientation between the intermediate and lower chambers.

Lastly, the invention may be incorporated into a cooling unit positionable in the rear door of a van, the door being hollow with a front wall, rear wall, right side wall, left side wall, top wall, and bottom wall defining therebetween an interior enclosure; the interior enclosure comprising two dividers one at generally the middle portion of the enclosure and the other at generally the upper portion of the enclosure, the middle divider being perforate and generally horizontal and the upper divider being imperforate and angled, the two dividers defining generally an upper, middle and lower chamber; the upper chamber having two vents, the second vent being located directly below the first vent, the upper chamber comprising a blower and an evaporator, the blower in taking warm air from outside the cooling unit through the second vented area, the flow of warm air being circulated over the evaporator then being discharged back outside of the cooling unit through the second vent; the middle chamber having a third vent, the middle chamber comprising a compressor and a fan, the fan drawing in ambient air from outside the cooling unit through the third vent, the ambient air being circulated over the condensing coils and then into the lower chamber through the perforations in the middle divider; the lower rear surface of the lower chamber having an aperture located therein to complete the circulation from the perforations of the middle divider to a location outside the cooling unit, the lower chamber comprising an internal combustion engine and an alternator for generating electric current for powering the condenser, blower and fan; tubing means for coupling the compressor, condenser and evaporator; a means for coupling an external fuel supply to the engine; a means for coupling an external electrical supply to the compressor, fan and blower; and a means for controlling the flow of powering current to the compressor, fan and blower.

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the disclosed specific embodiment may be readily utilized as a basis for modifying or designing other structures for carrying out the same purposes of the present invention. It should be realized by those skilled in the art that such equivalent structures do not depart from the spirit and scope of the invention as set forth in the appended claims.

BRIEF DESCRIPTION OF THE DRAWINGS

For a fuller understanding of the nature and objects of the present invention, reference should be had to the following detailed description taken in conjunction with the accompanying drawings in which.

Similar reference characters refer to similar parts throughout the several Figures.

DETAILED DESCRIPTION OF THE INVENTION

Figure 1:
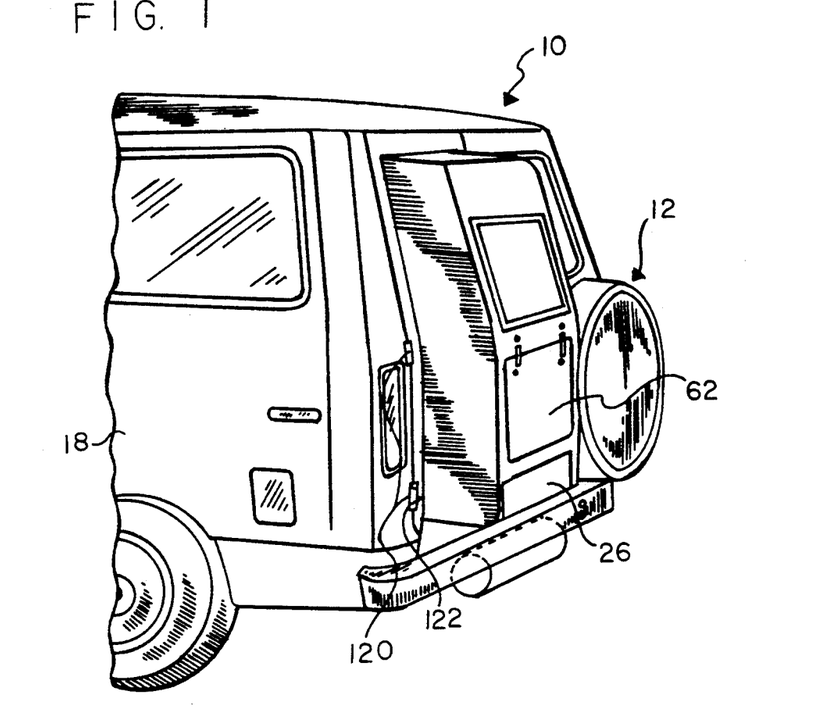
FIG. 1 is a perspective view of the rear of a van equipped with the air conditioning system of the present invention.

Shown in FIG. 1 is a van 10 equipped with the cooling system 12 of the present invention. The van is conventional in essentially all aspects with a front end 14, a rear end 16, sides 18 and with rear doors 20 and 22 pivotable about essentially vertical axes at the rear end 16. The van, however, is equipped with the integrated van cooling system 12 for supplementing the conventional air conditioning system (not shown).

Figure 6:
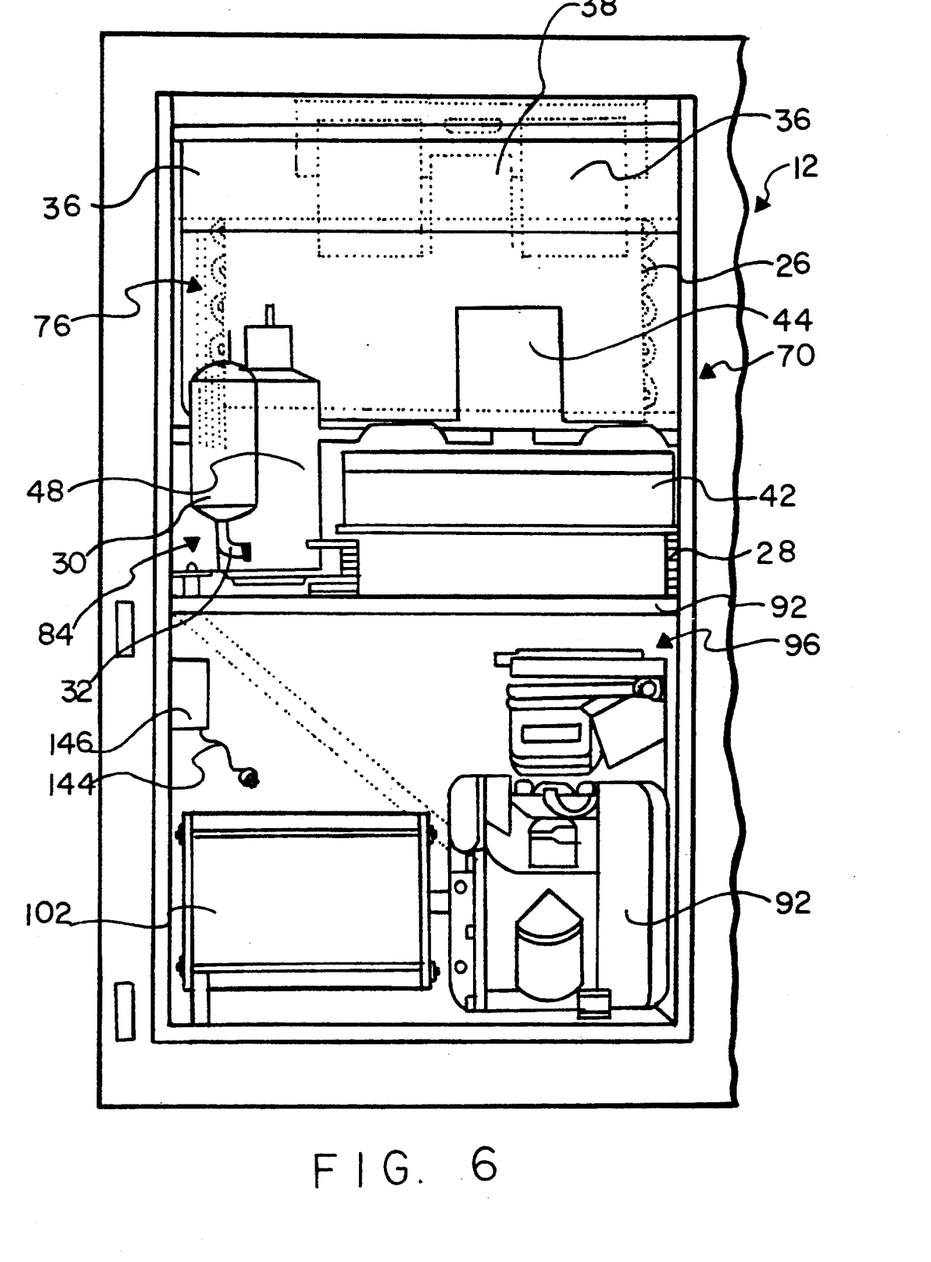
FIGS. 6, 7 and 8 are rear, side and top elevational views of the internal components of the air conditioning system shown in the prior Figures.
Figure 7:
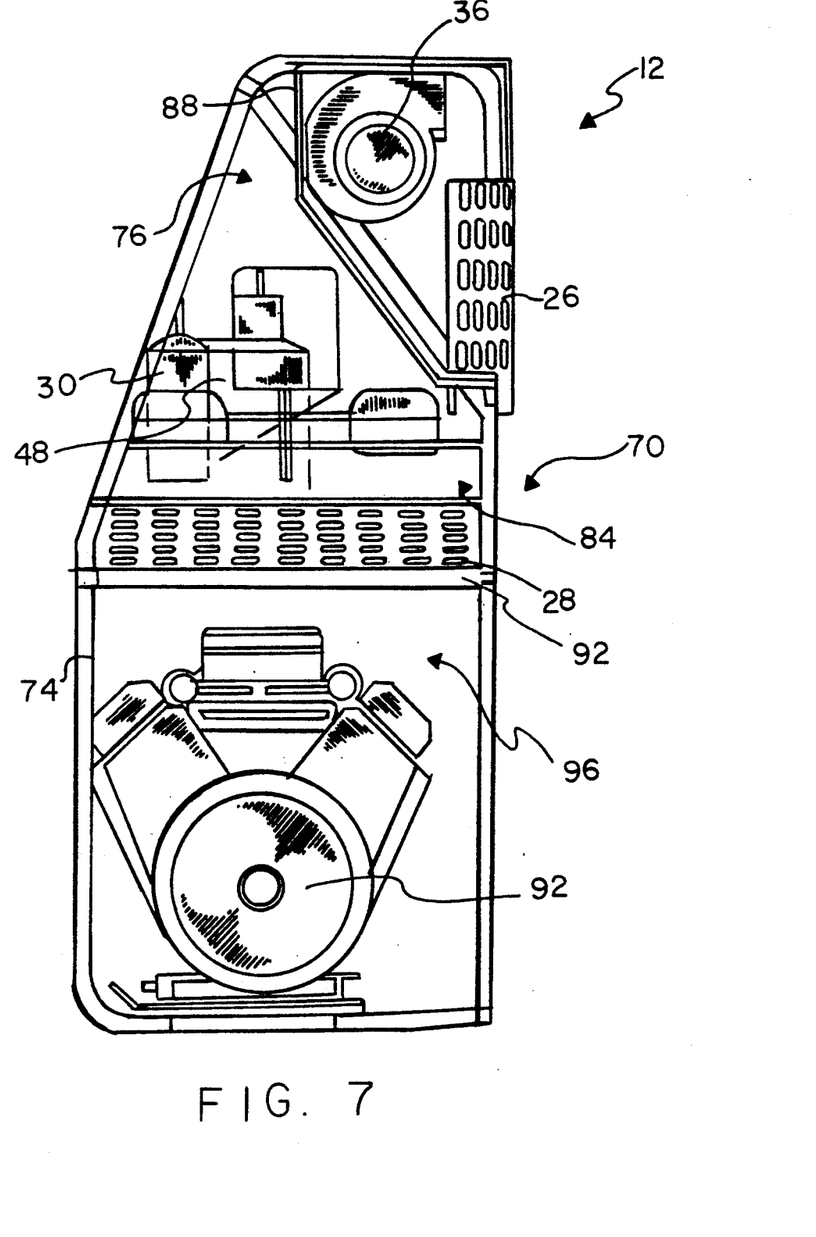
Figure 8:
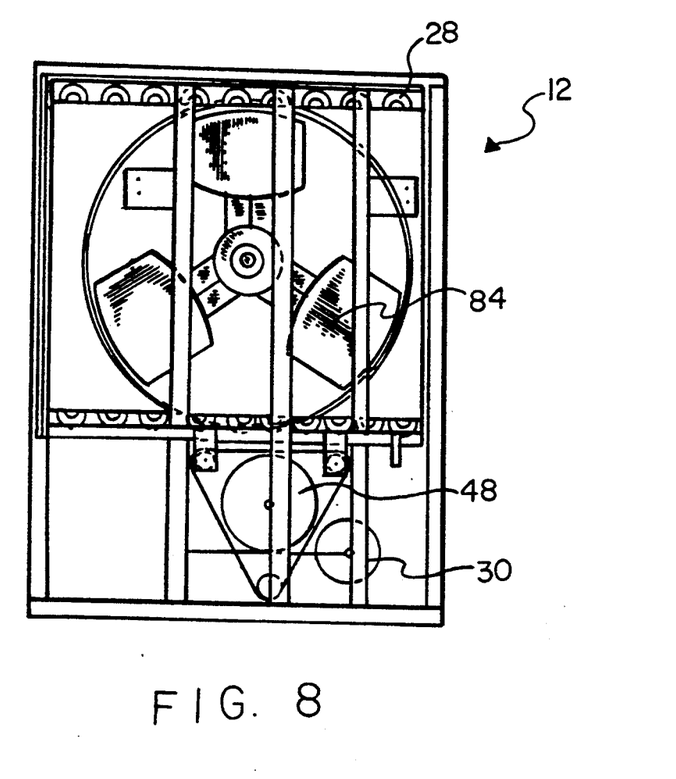

From a functional standpoint, the cooling system is essentially conventional in that it has three components: an evaporator 26, a condenser 28 and a compressor 30. Tubing 32 is used to connect the three components. An operating fluid is continuously circulated through the tubing 32 between the evaporator 26, condenser 28, and compressor 30. In the preferred embodiment the operating fluid being circulated is freon. Any other such coolant, however, may be employed.

In the evaporator 26, the freon is converted from the liquid to the vapor state. The evaporation of the freon from the liquid to the vapor state requires the input of energy to the freon. This energy is extracted from air which is being passed over the evaporator coils by an associated blower 36 operated by electric motor 38. This exchange of energy between air passing over the coils of the evaporator, and the freon in the coils results in the heating of the freon and the cooling of the air.

The heated evaporated freon in the vapor state is then passed to the compressor 30. The compressor is driven by electric motor 48 which functions to compress the liquid freon to thereby enable the freon to be more efficiently evaporated within the condenser 28. Within the condenser, the freon in the liquid state is cooled. This conversion is completed by circulating ambient air over the coils of the condenser. A fan 42, driven by electric motor 44, is used to push ambient air over the condenser coils and then discharge the warmed ambient air through the lower chamber and back into the environment. Upon leaving the condenser, the freon is circulated back to the evaporator wherein the cycle begins again in a continuous and automatic cycle of operation.

The cooling system of the present invention is contained within one of the rear doors 20, preferably the left rear door closer to the gas tank 54. The door 20 is formed with a contoured interior front panel 58 and a contoured exterior rear panel 60. Exterior generally vertical side panels 62 are coupled with respect to the front and rear panels 58 and 60 of the door 20. Top and bottom panels 64 and 66 are also coupled to the other associated door panels for coupling the front and rear panels around their peripheries. Within the space formed by the door panels is an internal equipment storage zone 70 for receiving the operating components of the air cooling system. Also positioned on the rear panel 60 of the door is an access service door 62. The service door 62 is hingably connected to the rear panel for allowing the driver to access, inspect and service the engine.

Within the internal equipment storage zone 70 is an internal frame 74 with generally vertical rigid rectangular tubing and located front and rear and at the sides. Horizontal tubing in a rectangular configuration is located at the upper, intermediate and lower positions of the vertical tubing and to constitute a box-like support for the operating elements of the van cooling system 12.

The storage zone includes upper, intermediate and lower chambers. In the upper chamber 76 is an air conditioning evaporator 26 and fan 36. The fan 36 induces or draws warm air from an upper area of the passenger section 78 of the van 10 through filtered opening 82 across the evaporator coil and discharges the cooled air through vents 80 in the interior contoured panel 58 in a forward direction back into the passenger section of the van. The gaseous refrigerant that flows through the evaporator is returned to an intermediate chamber 84 within the internal equipment storage zone for recycling into a liquid state.

The intermediate chamber 84 of the internal equipment storage zone contains the refrigerant condenser 28. The upper and intermediate chambers are separated by an imperforate plate 88. The condenser is rigidly attached to the internal tubular frame for rotation about a generally vertical axis. The condenser cools the refrigerant in a conventional manner and fan 42 discharges the heated air to the atmosphere through a plurality of downwardly directed louvers 86 on the exterior rear contoured panel. Electric motors 48 and 44 power the condenser 30 and fan 42. The fan 42 draws in ambient air from outside the cooling unit through the vented area 90 and circulates it over the coils of the condenser 28 and then into the lower chamber through the perforations in a middle divider 92 located between the middle and lower chamber.

Located in the lower chamber 96 is a gasoline powered engine 98. Also secured in the lower chamber is an alternator 102. The engine 98 drives the alternator 102 to create AC current for powering the electric motors for the compressor, evaporator and condenser through electric lines in the conventional manner.

The lower chamber has three separate apertures. Apertures 106, 108 and 110 are all located in the lower surface of the rear wall 60 of the enclosure. The first aperture 106 is used to couple the gasoline engine 98 to the fuel source 54 of the van 10. The second aperture 108 is used to couple the alternator 102 to the electrical source or battery 112 of the van 10. The third aperture 86 is used to complete the circulation of air from the perforations in the middle divider 92 to the environment. Additionally, in the preferred embodiment, there are controlling means 114 and 116 to control the engine and various motors from the front of the van or the back of the van.

Figure 2:
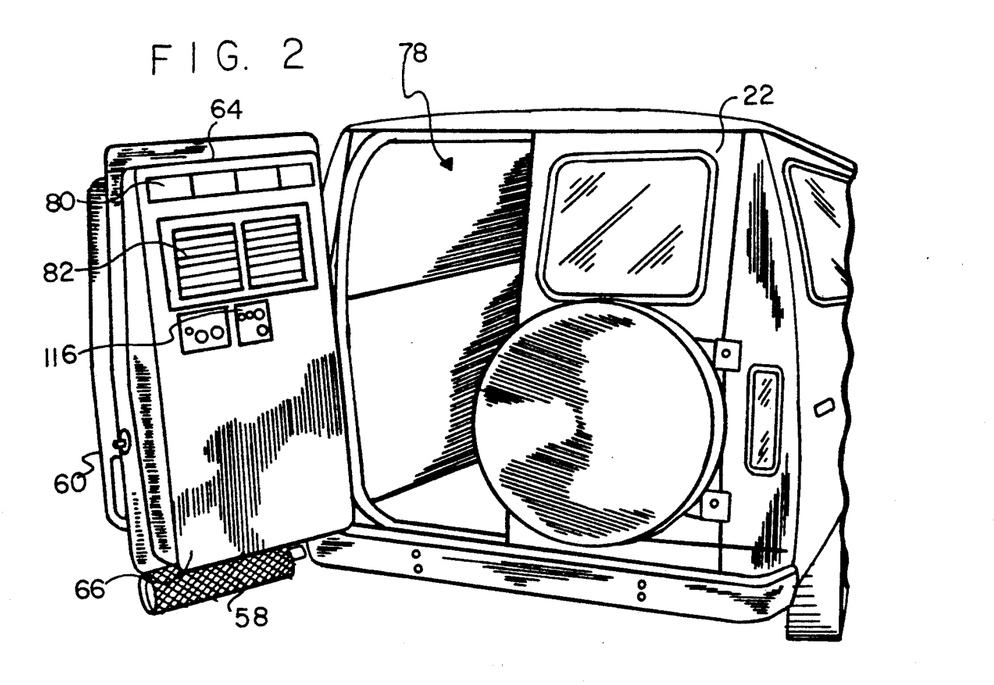
FIG. 2 is a perspective view of the rear of the van shown in FIG. 1 but with the rear door open to show the inner panel.
Figure 3:
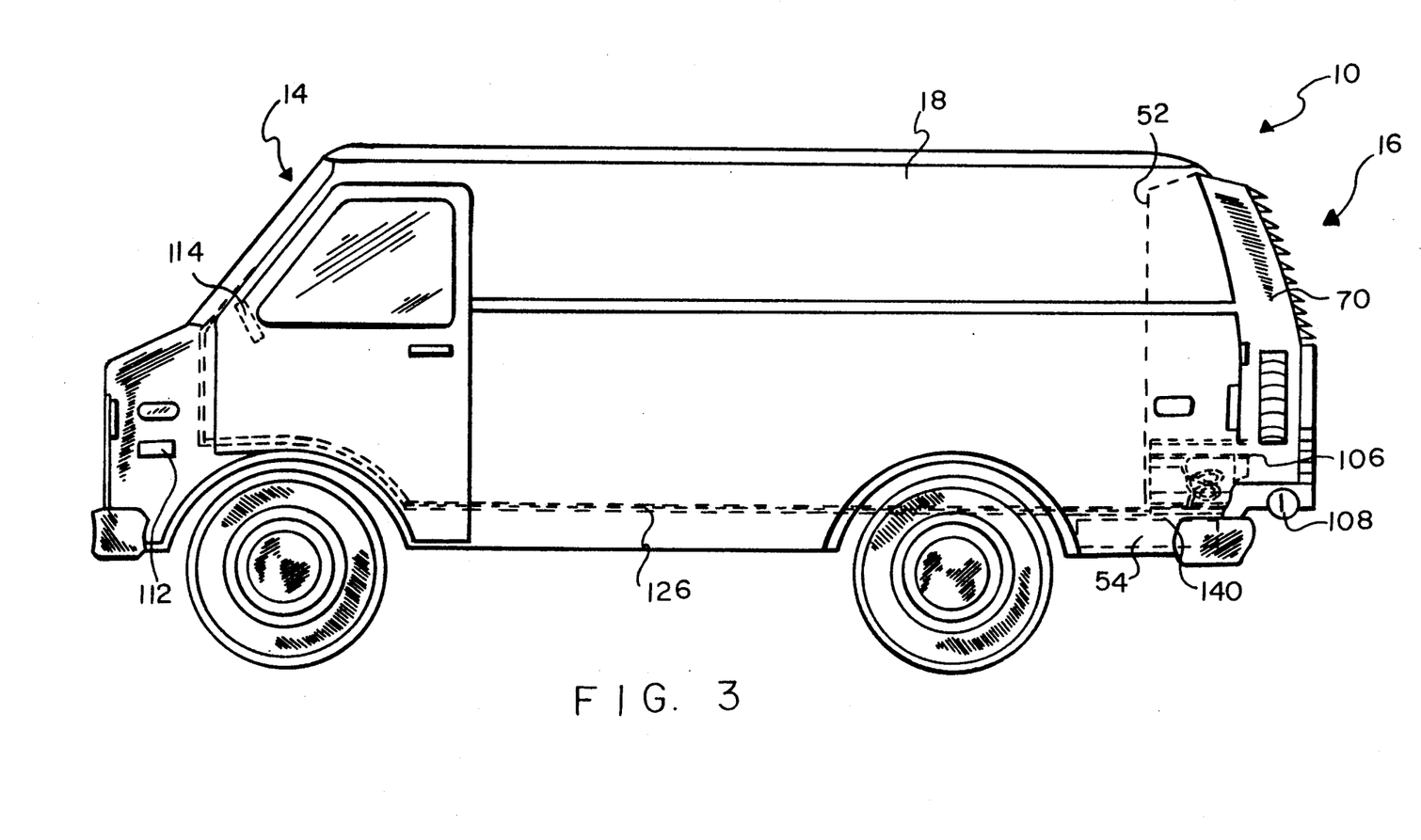
FIG. 3 is a side elevational view of the van of FIGS. 1 and 2.

All of the mechanisms for the cooling system 12 are supported within the door 20. The door 20 has secured to one lateral edge hinges 120 in a location corresponding to the hinges of the door normally sold with the van. The hinges 120 are adapted to be separated by the removing of the hinge bolts 122 to remove the normal door and for being recoupled for the application of the new door with the van cooling system.

Figure 5:
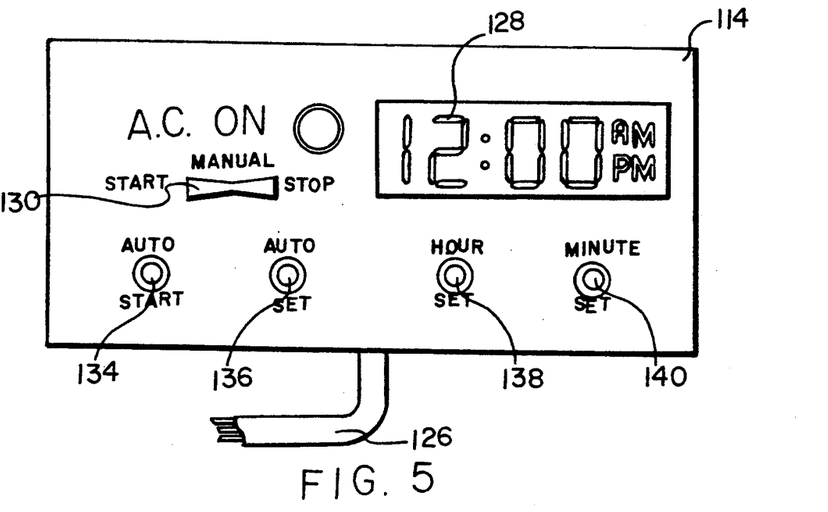
FIG. 5 is a plan view of the control panel for the air conditioning system illustrated in the prior Figures.

Operating in association with the functioning components of the van cooling system is a controller 114. The control box is located on the dash of the van for easy access by the operator. The control box is coupled to the operating mechanisms of the air conditioning system through a loom of wires 126 coupled therebetween. The control panel includes a light emitting diode 128 to indicate time. In addition, a rocker switch 130 and a plurality of buttons are provided for starting and stopping and otherwise controlling the air conditioning unit. The rocker switch 130 when toggled to the left will manually start the engine of the air conditioner. When toggled to the right, the air conditioning unit will be manually stopped. Therebeneath is an "auto start" button 134 and a "set auto" button 136. There are two adjacent buttons 138 and 140 for setting the hour and minute of the LED display. These first and second buttons allow for starting the air conditioning system automatically at a particular time. By pressing the auto start 134 for set orientation, the hours and minutes may be individually changed by depressing the hour and minute buttons on the control panel to change the time on the LED. The time set in this manner on the LED will indicate the time that the air conditioner will begin on its own without a manual initiation. Once the proper start time has been selected, the auto start 134 is depressed and the hours and minutes are selected. The operator will then press the set auto button 136 to lock in the start time. Thereafter, the actual time will appear on the LED. In addition, to one side of the panel is a light to indicate that the air conditioning unit is, in fact, running.

Controller 116 is on the interior of the door for being controlled by a person in the back of the van. The controller simply involves an on/off switch and a thermostatically controlled device, all conventional.

Extending out of the panel door 120 are four members. One is simply a ground wire mounted to the frame of the vehicle. One is an electrical wire fed along the bottom of the van to the battery. The third is an electrical wire 126 extending to the control panel 114, preferably mounted on the dashboard adjacent to the driver. And, the fourth is a flexible tubing 142 adapted to be spliced into the tubing from the gas tank to the main engine. These are the only couplings between the door and the existing components of the van except for hinge pins.

Lastly, an electrical line 144 with plug extends from a panel box 146 to exterior via an extension cord for coupling with a remote source of electricity to power the motors for the condenser, fan and blower. This is to power the air conditioning system from a source other than the internal combustion engine. It extends from the system through the access door. A switch is at the input of the panel box for receiving electrical input from either the electrical line 144 or the alternator 102, but not both. The output of the panel box 146 is a switch operable from one end or both of the control panels to power the various components of the air conditioning system.

Figure 4:
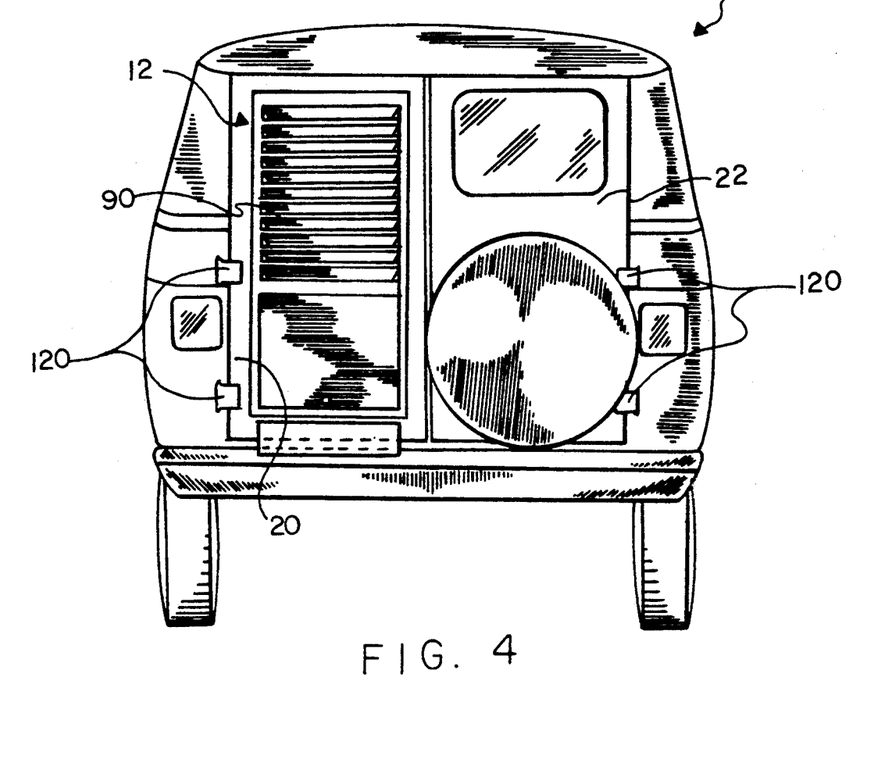
FIG. 4 is a rear elevational view of the van shown in FIGS. 1 through 3.

The preferred internal combustion engine for the present invention is a Briggs and Stratton 12.5 H.P. engine rated for 2,000 hours of usage and drives a 4000 watt A.C. alternator. In this manner, the air conditioning unit is a self-contained member for easy application to modify known vans. The various or described members need only be simply coupled to existing components of the van. In order to appropriately check and service the air conditioning system a door 62 is provided in the back panel of the door. An upper horizontal hinge allows convenient access to the interior components.

The invention is intended to supplement existing air conditioning units found in vans or other vehicles. The air conditioning unit is adapted to be totally contained in the new back door of the van. It is of a very thin profile so as to minimize size and inconvenience to the user of the van. In total, van doors are normally at the most 4½ inches thick. The spare tire on the right door takes up an additional 14 inches for a total a little over 18 inches. The present invention takes up a total of 20 inches. Although this appears to be slightly greater than that of the right hand door, there is, in fact, minimum loss of space. For example, in the lower door seal or threshold, the door extends inwardly about 3½ inches which positions it rearwardly of the upward ceiling of the van. As such, the high maximum height is not lost. Further, the van extends outwardly from the bumper about 8 inches which means that it does not extend outwardly as far as the spare tire of the right hand door.

The present disclosure includes that contained in the appended claims as well as that of the foregoing description. Although this invention has been described in its preferred forms with a certain degree of particularity, it is understood that the present disclosure of the preferred form has been made only by way of example and numerous changes in the details of construction and combination and arrangement of parts may be resorted to without departing from the spirit and scope of the invention.

Now that the invention has been described,
What is claimed is:

1. An integrated van cooling system for the direct replacement of an existing rear door in a van comprising in combination:

a rear door having an interior front panel and an exterior rear panel coupled around their peripheries for defining therebetween an internal equipment storage zone; and an upper chamber within the storage zone having evaporator and blower means positioned for drawing warm air from a passenger section of the van through the upper chamber and for discharging cooled air back into the passenger section of the van;

a lower chamber within the storage zone having an engine positioned for generating power and an alternator for converting such power into alternating current;

an intermediate chamber within the storage zone having a freon compressor operatively coupled with respect to the engine for compressing and circulating the cooling fluid;

condensing means in the storage zone between the intermediate and lower chambers with an associated fan for transferring the heat from the refrigerant in a flow of air from a source of outside air and discharging the warmed outside air to the atmosphere through a plurality of louvers on the exterior rear panel;

control means to regulate the starting and stopping of the fan, blower means and the compressor;

supply means for delivering gasoline to the engine; and a plurality of hinge means extending outwardly from one of the panels for mating with the body hinges on the van.

2. An integrated van cooling system as recited in claim 1 wherein one of the panels includes a plurality of louvered openings depending outwardly and downwardly for urging induction of fresh air to support the continued combustion process within the gasoline powered engine and wherein the rear panel further includes a plurality of parallel, louvered openings depending outwardly and downwardly for urging discharge of the exhaust gases produced by the motor.

3. An integrated van cooling system as recited in claim 1 and further including an access service door hingably connected to the rear panel for allowing the driver to access, inspect and service the engine.

4. An integrated van cooling system as recited in claim 1 and further including an alternator coupled to an electric motor for driving the compressor, fan and blower motors.

5. An integrated van cooling system as recited in claim 1 wherein the control means further includes a rocker switch, a plurality of other switches, a light emitting diode and a panel light for operating and controlling the gasoline powered engine, and for indicating the time and operational status of the gasoline powered engine to the operator.

6. An integrated cooling system as recited in claim 5 wherein the control panel is mounted on the dashboard adjacent to the driver in the passenger section of the van for housing the control means.

7. An integrated cooling system as set forth in claim 1 and further including a power cord couplable to an external source of current for powering the compressor, fan and blower independent of the engine.

8. A replacement rear door for a van comprising in combination:

an interior front panel, an exterior rear panel with exterior peripheral panels defining an internal equipment storage zone;

an air conditioning system housed entirely within the equipment storage zone for cooling the warm air generated in the passenger section of the van;

a gasoline powered internal combustion engine for generating the power to operate the air conditioning system;

gasoline connection means adapted to be coupled into the main gasoline supply line for supplying fuel to the engine;

electric connection means adapted to couple the main battery of the van to the peripheral equipment of the engine;

electronic means for controlling the stopping and starting of the air conditioning system; and hinge means extending outwardly from one of the exterior side panels for mating with the body hinges on the van.

9. A replacement rear door as recited in claim 8 wherein the replacement rear door is used to replace one existing rear door on the van.

10. A replacement rear door as recited in claim 9 wherein the air conditioning system comprises a lower chamber supporting the engine, an upper chamber supporting an evaporator and blower, intermediate chamber supporting a compressor, and a condenser rigidly attached in a generally vertical orientation between the intermediate and lower chambers.

11. A cooling unit positionable in the rear door of a van, the door being hollow with a front wall, rear wall, right side wall, left side wall, top wall, and bottom wall defining therebetween an interior enclosure;

the interior enclosure comprising two dividers one at generally the middle portion of the enclosure and the other at generally the upper portion of the enclosure, the middle divider being perforate and generally horizontal and the upper divider being imperforate and angled, the two dividers defining generally an upper, middle and lower chamber;

the upper chamber having two vents, the second vent being located directly below the first vent, the upper chamber comprising a blower and an evaporator, the blower in taking warm air from outside the cooling unit through the second vented area, the flow of warm air being circulated over the evaporator then being discharged back outside of the cooling unit through the second vent;

the middle chamber having a third vent, the middle chamber comprising a compressor and a fan, the fan drawing in ambient air from outside the cooling unit through the third vent, the ambient air being circulated over the condensing coils and then into the lower chamber through the perforations in the middle divider;

the lower rear surface of the lower chamber having an aperture located therein to complete the circulation from the perforations of the middle divider to a location outside the cooling unit, the lower chamber comprising an internal combustion engine and an alternator for generating electric current for powering the condenser, blower and fan;

tubing means for coupling the compressor, condenser and evaporator;

a means for coupling an external fuel supply to the engine;

a means for coupling an external electrical supply to the compressor, fan and blower; and a means for controlling the flow of powering current to the compressor, fan and blower.

* * * * *